(12) United States Patent
Holma et al.

(10) Patent No.: US 9,148,875 B2
(45) Date of Patent: Sep. 29, 2015

(54) CHANNELIZATION CODE SHARING BETWEEN MULTIPLE USERS

(75) Inventors: Harri Kalevi Holma, Helsinki (FI); Antti Anton Toskala, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 198 days.

(21) Appl. No.: 13/996,041

(22) PCT Filed: Nov. 21, 2011

(86) PCT No.: PCT/EP2011/070582
§ 371 (c)(1),
(2), (4) Date: Jun. 20, 2013

(87) PCT Pub. No.: WO2012/084378
PCT Pub. Date: Jun. 28, 2012

(65) Prior Publication Data
US 2013/0287008 A1    Oct. 31, 2013

(30) Foreign Application Priority Data
Dec. 20, 2010  (EP) .................. PCT/EP2012/070259

(51) Int. Cl.
*H04L 1/02*  (2006.01)
*H04L 1/16*  (2006.01)
(Continued)

(52) U.S. Cl.
CPC ......... *H04W 72/0406* (2013.01); *H04B 7/2618* (2013.01); *H04J 13/16* (2013.01)

(58) Field of Classification Search
CPC ... H04L 1/1671; H04L 1/1644; H04L 1/1607; H04L 5/003; H04L 5/0032; H04L 5/0044; H04L 5/0053; H04L 5/0058; H04L 5/0078

USPC .......................... 370/328–330, 342, 349, 252
See application file for complete search history.

(56) References Cited

U.S. PATENT DOCUMENTS

2003/0053478 A1    3/2003  Hsu et al. ...................... 370/441
2003/0114162 A1*   6/2003  Chheda et al. ................ 455/447
(Continued)

FOREIGN PATENT DOCUMENTS

EP    1 304 825 A1    4/2003
EP    1 388 964 A1    2/2004
(Continued)

OTHER PUBLICATIONS

TSG-RAN WG1#32 meeting, Disneyland, Marne la Vallee, France, May 19-23, 2003; "Considerations on DL signaling channel structure supporting UL Enhanced-DCH"; Tdoc R1-030494.
(Continued)

*Primary Examiner* — Wutchung Chu
(74) *Attorney, Agent, or Firm* — Harrington & Smith

(57) ABSTRACT

A method of exchanging data in a communications network is provided. A control channel channelization code is assigned for transmitting user specific data channel allocation information to a particular mobile station (MS). The data channel allocation information indicates which part of the transmission time interval (TTI) available for data can be used by that particular MS. The control channel channelization code is shared in a TDMA fashion between the MSs during the TTI in a proportion equal to that in which the data channel channelization code is shared between the MSs such that each MS is allocated a share of the control channel channelization code in that part of the TTI. The control channel channelization code is then transmitted in a part of the TTI corresponding to that in which the data channel channelization code is transmitted for a particular MS.

15 Claims, 9 Drawing Sheets

(51) Int. Cl.
*H04J 3/16* (2006.01)
*H04J 3/24* (2006.01)
*H04W 72/04* (2009.01)
*H04J 13/16* (2011.01)
*H04B 7/26* (2006.01)

(56) References Cited

U.S. PATENT DOCUMENTS

| | | | |
|---|---|---|---|
| 2003/0185159 A1 | 10/2003 | Seo et al. | 370/278 |
| 2007/0104150 A1* | 5/2007 | Fernandez-Corbaton et al. | 370/335 |
| 2007/0133458 A1* | 6/2007 | Chandra et al. | 370/329 |
| 2008/0056229 A1* | 3/2008 | Gholmieh et al. | 370/349 |
| 2009/0103497 A1* | 4/2009 | Fernandez-Corbaton et al. | 370/335 |
| 2009/0197633 A1* | 8/2009 | Kawamoto et al. | 455/522 |
| 2011/0110337 A1* | 5/2011 | Grant et al. | 370/335 |
| 2012/0113832 A1* | 5/2012 | Montojo et al. | 370/252 |

FOREIGN PATENT DOCUMENTS

| | | |
|---|---|---|
| WO | WO2008/115837 A1 | 9/2008 |
| WO | WO2011/018112 A1 | 2/2011 |

OTHER PUBLICATIONS

TSG-RAN WG1#38bis, Seoul, Korea, Sep. 20-24, 2004; "Downlink Control Signaling"; R1-041177.

* cited by examiner

CHANNELIZATION CODE SHARING BETWEEN MULTIPLE USERS

FIELD OF THE INVENTION

The invention generally relates to a method of exchanging data in a communications network. More particularly, the invention relates to reducing the latency/delay in 3GPP HSPA networks.

BACKGROUND OF THE INVENTION

The demand for higher data rates and the growth of mobile broadband services continues to push the need to advance HSPA (high speed packet access) technology.

For example, 3GPP HSDPA (high speed downlink packet access) with Multiple Input Multiple Output (MIMO) transmission has been defined in 3GPP Release 7 to enable a 28 Mbps data rate. The combination of MIMO and 64QAM provides a 42 Mbps in Release 8 and in Release 9, dual cell HSDPA and MIMO and 64 QAM are defined to enable 84 Mbps. Release 10 will be approaching even higher data rates with 168 Mbps being achievable by having four carriers and MIMO. With the increased data rates, the buffer sizes in the devices (user equipment or UEs) also increase when the delay is unchanged.

As the data rates keep increasing in the future, the resulting buffers will grow even more and earlier solutions employed in HSPA will not be able to reduce the resulting latency/delay.

Therefore a solution is required for HSPA networks, which increases efficiency and reduces delay when the data rates, and therefore the size of the buffers, increase.

SUMMARY OF THE INVENTION

Accordingly, a method of exchanging data in a communications network is provided. The method includes sharing a data channel channelization code in a downlink transmission part of a data channel in a TDMA fashion between mobile stations during a transmission time interval such that each mobile station is allocated a share of the data channel channelization code in a part of the transmission time interval. A control channel channelization code is assigned for transmitting user specific data channel allocation information to a particular mobile station. The data channel allocation information indicates which part of the transmission time interval available for data can be used by that particular mobile station. The control channel channelization code is shared in a TDMA fashion between the mobile stations during the transmission time interval in a proportion equal to that in which the data channel channelization code is shared between the mobile stations such that each mobile station is allocated a share of the control channel channelization code in that part of the transmission time interval. The control channel channelization code is transmitted in a part of the transmission time interval corresponding to that in which the data channel channelization code is transmitted for a particular mobile station.

The data channel channelization code is shared between the mobile stations on the data channel over a time slot so that each mobile station has a share of the code allocated to it in its share of the time slot on the data channel. The share of the data channel channelization code is then transmitted to a particular mobile station in its share of the time slot. Control channel channelization code is then also divided between the mobile stations on the control channel over the time slot so that each mobile station receives a share of the control channel channelization code in the same part of the time slot as it received the data channel channelization code.

In this way, radio performance is improved and HSPA latency is reduced since the downlink transmission delay is decreased. Furthermore the MIMO performance is improved and made more efficient since code multiplexing is reduced. Due to the shorter latency on the radio transmission, the application data rate (/TCP/IP performance) is increased.

During uplink transmission, each mobile station may use its own uplink code for uplink feedback in an uplink feedback timeslot. The uplink code can then occupy the transmission time interval corresponding to that in which the data channel and control channel channelization code is transmitted for that particular mobile station.

This provides the advantage that fewer HARQ processes are required (the number of HARQ processes is reduced from 6 to 4) and therefore a reduced amount of memory and buffer size is required in the UE devices.

Each uplink feedback time slot may carry an acknowledgment of a downlink transmission of a corresponding downlink time slot. Alternatively, if a channel quality indicator is scheduled for the mobile station, a first uplink time slot can carry a sum of acknowledgments from each TDMA multiplexed data allocation. Second and third uplink time slots can then carry the channel quality indicator for each time slot.

Data may be transmitted using at least partially HS-PDSCH and the control channel can be a HS-SCCH.

In one embodiment, the control channel indicates if TDMA is in use during the downlink transmission time interval, which can be 2 ms. The transmission time interval can be divided into three parts.

Advantageously, the method further comprises allocating a CDMA share of the data channel channelization code to a further mobile station over the whole transmission time interval. This means that legacy mobile stations may operate as they have done previously and will not be aware of any difference in operation in the network.

The invention also provides a method of transmitting data in a communications network, in which during downlink transmission part of a data channel channelization code is shared in a TDMA fashion between a group of mobile stations in the network during a transmission time interval. This means that each mobile station is allocated a share of the data channel channelization code in a part of the transmission time interval. A control channel channelization code is assigned to a particular mobile station in the group over the transmission time interval. The control channel channelization code is assigned for transmitting user specific data channel allocation information and is shared in a CDMA fashion between the group of mobile stations during the transmission time interval. The data channel allocation information indicates which part of the transmission time interval available for data can be used by that particular mobile station. During uplink transmission, each mobile station uses its own uplink code for uplink feedback in an uplink feedback timeslot. The uplink code occupies the transmission time interval corresponding to that in which the data channel channelization code is transmitted for that particular mobile station.

The data channel channelization code is shared between the mobile stations on the data channel over a time slot so that each mobile station has a share of the code allocated to it in its share of the time slot on the data channel. The share of the data channel channelization code is then transmitted to a particular mobile station in its share of the time slot. Control channel channelization code is then assigned to each mobile station over the whole time slot on the control channel. During uplink transmission, each mobile station may use its own uplink code for uplink feedback in an uplink feedback timeslot. The uplink code can then occupy the transmission time interval corresponding to that in which the data channel channelization code is transmitted for that particular mobile station.

In this way, latency is reduced in downlink transmissions and fewer HARQ processes are required. This provides the advantage that a reduced amount of memory and buffer size is required in the UE devices.

Each uplink feedback time slot may carry an acknowledgment of a downlink transmission of a corresponding downlink time slot. Alternatively, if a channel quality indicator is scheduled for the mobile station, a first UL time slot carries a sum of acknowledgments from each TDMA multiplexed data allocation and second and third UL time slots carry the channel quality indicator for each time slot.

Data can be transmitted using at least partially HS-PDSCH and the control channel can be a HS-SCCH. The control channel may further indicate if TDMA is in use during the downlink transmission time interval, which can be 2 ms and may also be divided into three parts.

The invention further provides a mobile station. The mobile station includes a receiver configured to receive a TDMA share of channelization code in a data channel in a part of a transmission time interval.

The receiver is also configured to receive assigned control channel channelization code containing user specific data channel allocation information. The user specific data channel allocation information indicates which part of the transmission time interval available for data can be used by the mobile station. The receiver is further configured to receive a TDMA share of control channel channelization code during the transmission time interval in a proportion equal to that of the received TDMA share of data channel channelization code, and to receive the control channel channelization code in a part of the transmission time interval corresponding to that in which the data channel channelization code is received. The mobile station further includes a transmitter configured to transmit an uplink code for uplink feedback in an uplink feedback timeslot. The uplink code occupies the transmission time interval corresponding to that in which the data channel channelization code was received by the receiver.

In this way, fewer HARQ processes are required, which provides the advantage that the memory and buffer size (and the amount of memory required) in the mobile station can be reduced.

The transmitter may be further configured to transmit in each uplink feedback time slot an acknowledgment of a corresponding downlink time slot received at the receiver.

Alternatively, if a channel quality indicator is scheduled for the mobile station, the transmitter is further configured to transmit in a first UL time slot a sum of acknowledgments from the mobile station and to transmit in second and third UL time slots the channel quality indicator for each time slot.

The invention further provides a network node for a wireless communications network. The network node includes a processor configured to share a data channel channelization code in a downlink transmission part of a data channel in a TDMA fashion between mobile stations during a transmission time interval such that each mobile station is allocated a share of the data channel channelization code in a part of the transmission time interval. The processor is also configured to assign a control channel channelization code for transmitting user specific data channel allocation information to a particular mobile station. The data channel allocation information indicates which part of the transmission time interval available for data can be used by that particular mobile station. The processor is further configured to share the control channel channelization code in a TDMA fashion between the mobile stations during the transmission time interval in a proportion equal to that in which the data channel channelization code is shared between the mobile stations. This means that each mobile station is allocated a share of the control channel channelization code in that part of the transmission time interval. A transmitter is configured to transmit the control channel channelization code in a part of the transmission time interval corresponding to that in which the data channel channelization code is transmitted for that particular mobile station. Furthermore, a receiver is provided, which is configured to receive an uplink code as uplink feedback in an uplink feedback timeslot, with the uplink code occupying the part of the transmission time interval corresponding to that in which the data channel channelization code is transmitted for that particular mobile station.

The invention will now be described, by way of example only, with reference to specific embodiments, and to the accompanying drawings, in which:

DETAILED DESCRIPTION OF EXEMPLARY EMBODIMENTS

Figure 1:
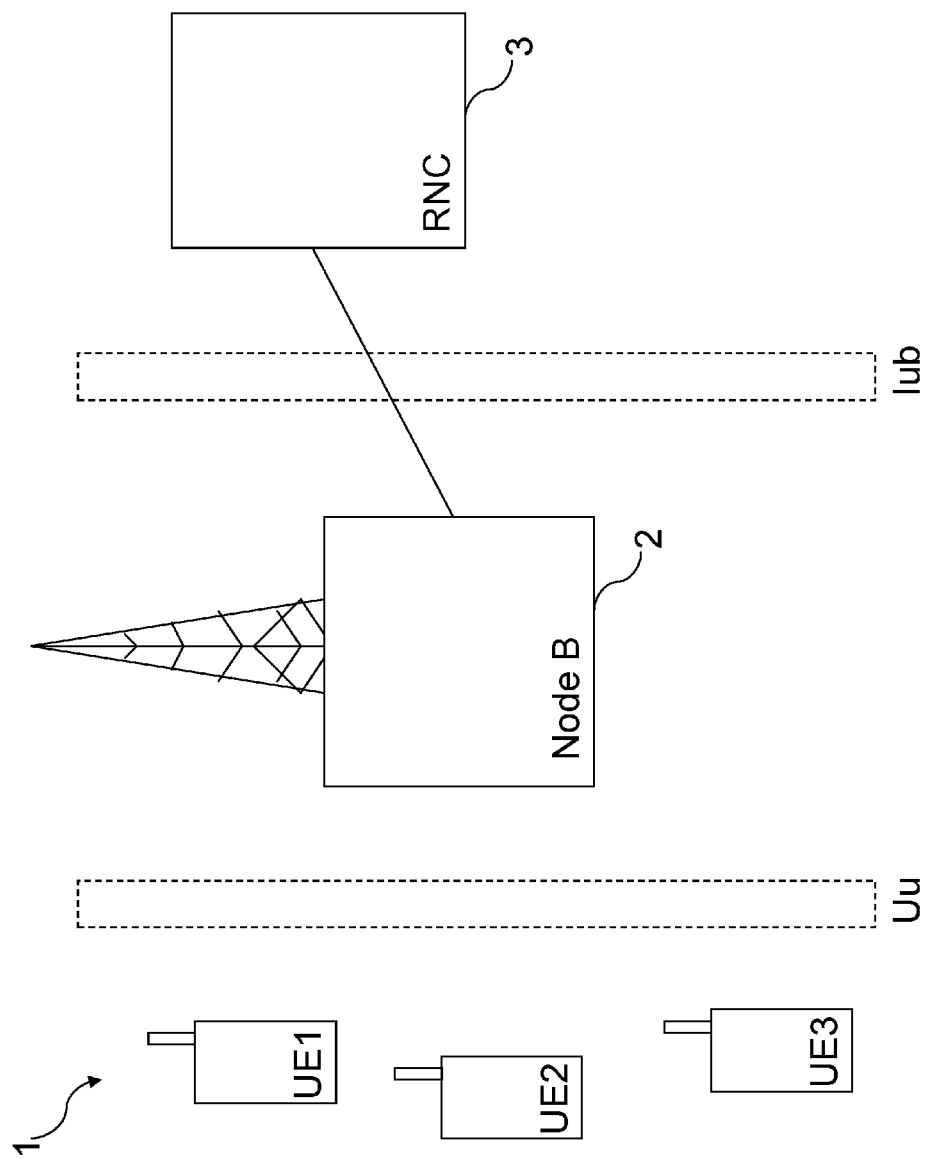
FIG. 1 is a simplified schematic diagram of a wireless communications network in which a method according to an embodiment of the invention may be implemented.

FIG. 1 shows a radio access network 1, which is part of a wireless communications network. The network illustrated here is a UMTS (WCDMA) network but the invention as described herein is not limited to this type of communications network.

Figure 2:
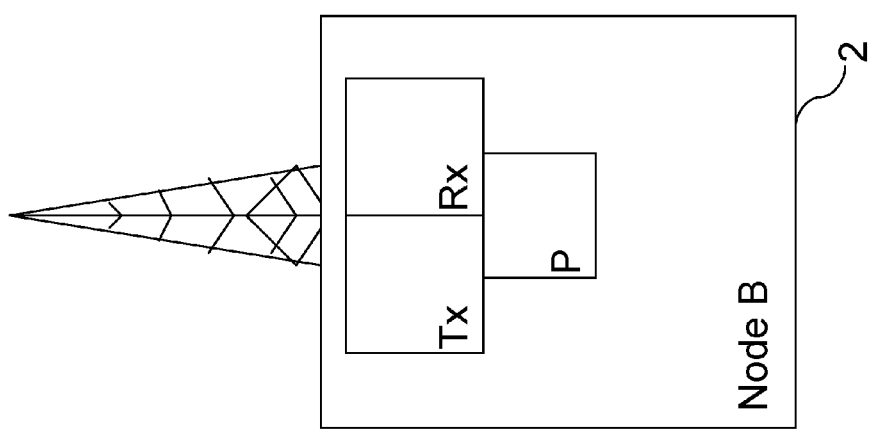
FIG. 2 is a simplified schematic diagram of a network node according to an embodiment of the invention.

The network 1 includes a Node B 2 coupled to a radio network controller (RNC) 3 over an Iub interface. The Node B 2 is shown in more detail in FIG. 2 and includes a transmitter Tx, a receiver Rx and a processor P. Mobile stations or user equipment (UE) UE1, UE2 and UE3 may access the network 1 via the Node B 2 over the Uu interface.

Figure 3:
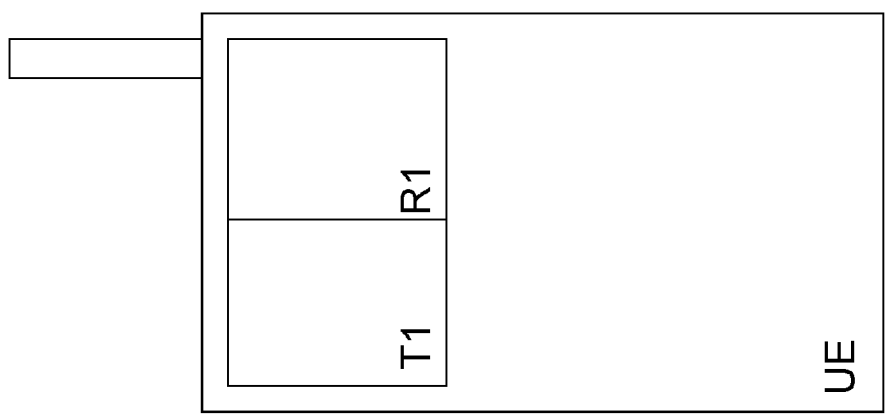
FIG. 3 is a simplified schematic diagram of a mobile station according to an embodiment of the invention.

The UEs UE1, UE2 and UE3 may be mobile telephones, computers, personal digital assistants (PDAs) or any device capable of accessing and exchanging data with the network 1. Each UE UE1, UE2, UE3 includes a transmitter T1 and a receiver R1, as shown in FIG. 3.

Figure 4:
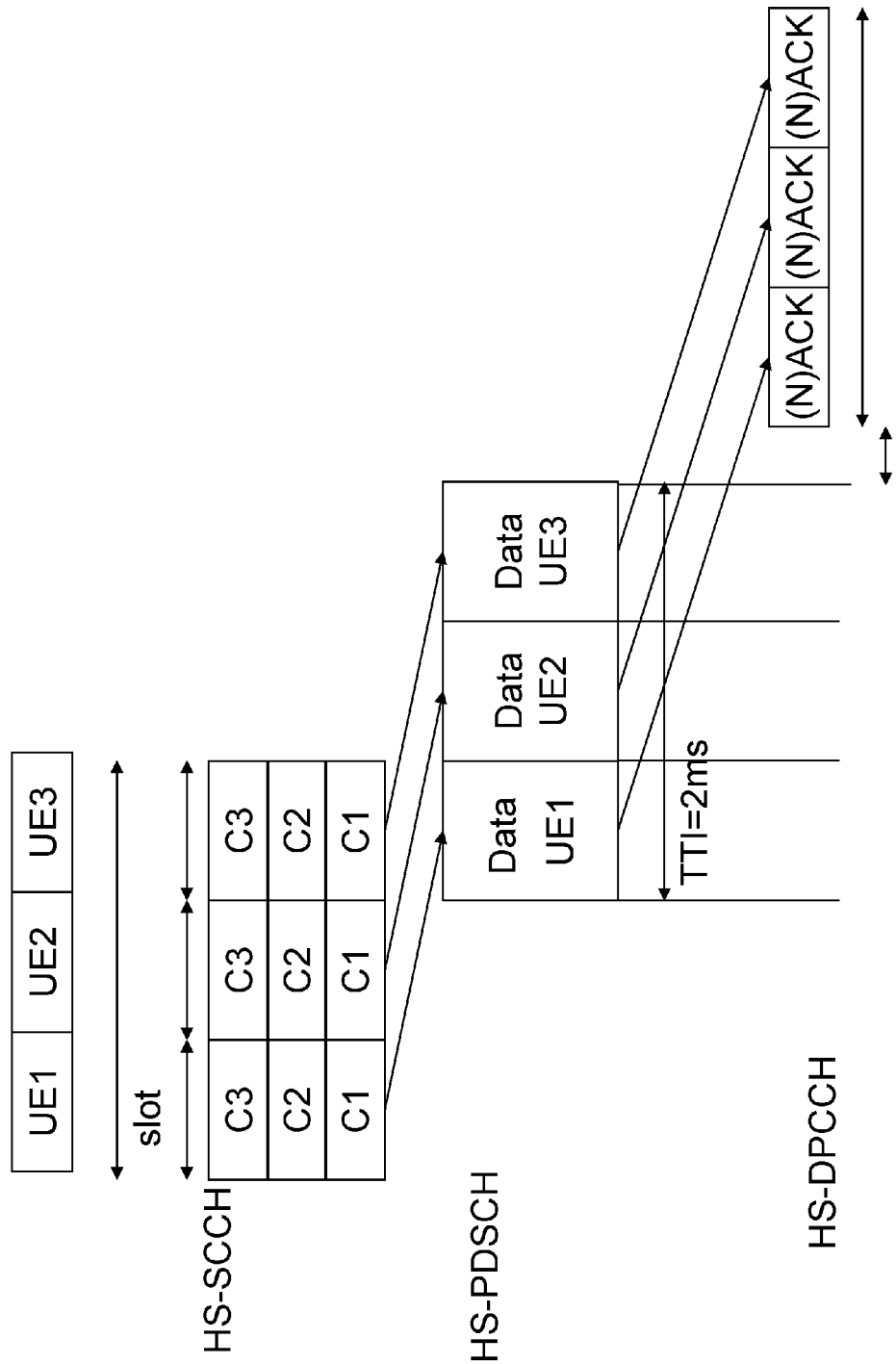
FIG. 4 is a schematic diagram of a channel structure for a communications network according to an embodiment of the invention.
Figure 5:
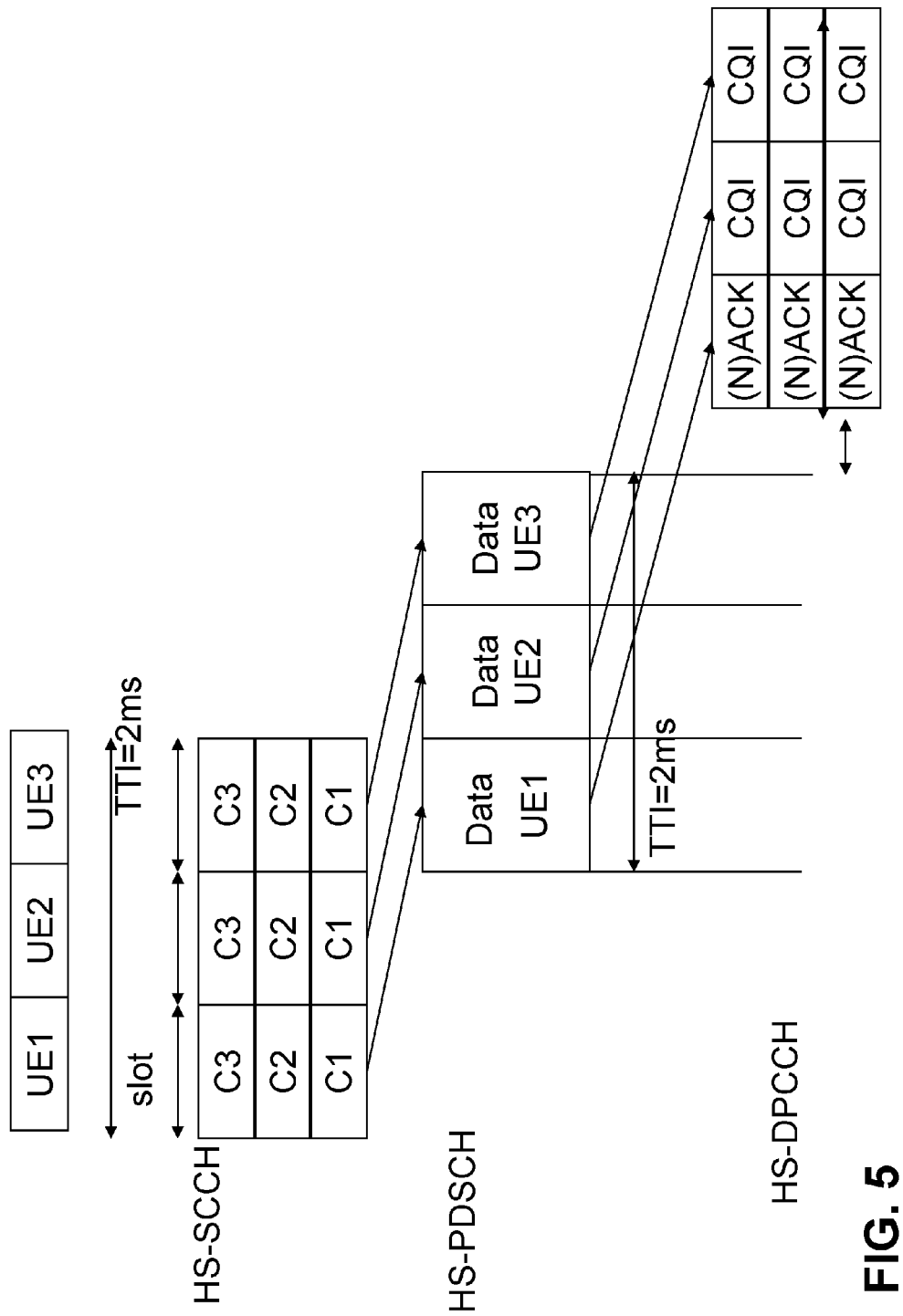
FIG. 5 is a schematic diagram of a channel structure for a communications network according to an embodiment of the invention.
Figure 6:
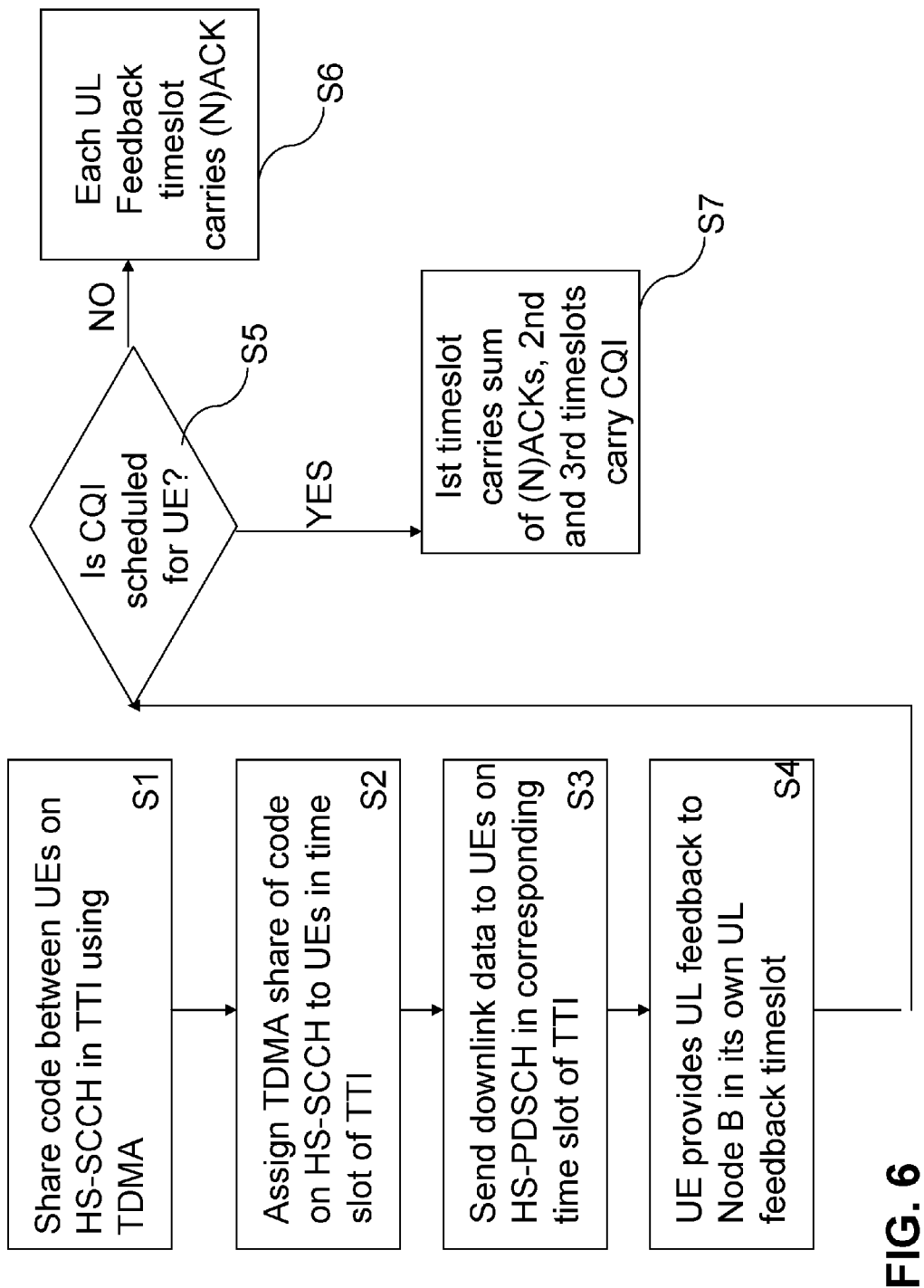
FIG. 6 is a flow diagram illustrating a method according to an embodiment of the invention.

FIGS. 4 and 5 are schematic block diagrams of the channel structure used in the method according to a first embodiment of the invention. A flow chart illustrating the method according to the first embodiment is shown in FIG. 6. The HS-PDSCH channel carries user data and the HS-SCCH is a fixed data rate control channel carrying channelization code information necessary for HS-PDSCH demodulation by the UE UE1, UE2, UE3. The HS-DPCCH is the channel on which acknowledgements are sent by the UEs UE1, UE2 and UE3 to the Node B 2 on the uplink. All the UEs UE1, UE2 and UE3 are configured in MIMO mode.

In the first embodiment of the invention, during downlink data transmission in the network, the processor P in the NodeB 2 selects whether to allocate more than one user during 2 ms TTI. In case more than one user is to be allocated, the processor P in the Node B 2 selects the channelization code of the HS-SCCH control channel C1, C2 or C3 to be used for each UE UE1, UE2 and UE3, respectively, using time division multiplexing (TDMA) and code division multiplexing (CDMA) such that the channelization code used for the HS-SCCH control channel C1, C2 or C3 is shared between the UEs UE1, UE2 and UE3 in a TDMA fashion and also in a CDMA fashion over the TTI and corresponds to the part of the 2 ms frame to be allocated to a particular UE UE1, UE2 or UE3 (and to be received by the UE at its receiver R1).

In other words, the channelization codes C1, C2 or C3 of the control channel are "mapped" to a respective UE UE1, UE2 or UE3, and the channelization codes on the HS-SCCH control channel are time multiplexed (Step S1). Each code C1, C2 and C3 then takes up each ⅔ ms slot of the TTI.

For example, in the case where the 2 ms TTI is allocated in the slot level, 3 HS-SCCHs are chosen and each of the channelization codes chosen by the network node NodeB for the HS-SCCH will also indicate the part of the 2 ms TTI to be chosen (so that, in this example, the TTI is divided into three parts or slots each of duration 0.667 ms). In the case that the UEs are legacy devices, the 2 ms TTI would be filled with time multiplexed and code multiplexed control channel channelization code and in that case the HS-SSCH code could be selected freely from the list of HS-SCCH codes signaled for each device. The channelization code C1, C2 or C3 on the HS-SCCH is assigned to each UE UE1, UE2 and UE3, respectively, then indicates to each UE UE1, UE2 and UE3 which part of the 2 ms TTI to demodulate on the HS-PDSCH (Step S2). Data is then coded with the three different codes C1, C2, C3 and sent in the corresponding slot of the TTI which corresponds to the respective UE UE1, UE2, UE3 and/or the HS-PDSCH (Step S3).

This results in an enhanced method, which multiplexes the HS-SCCH by codes and additionally by time, where timing of HS-SCCH is aligned to and adopted from the HS-PDSCH data channel(in which 1 UE per slot of TTI=2 ms).

In other words, control information is sent during a 2 ms TTI by dividing it into 3 slots or segments each of 0.667 ms duration. The information of the first segment is coded with the first code C1, the second segment is coded with the second code C2, the third segment is coded with the third code C3 and the 3 resulting segments related to one UE UE1, UE2, UE3 are transmitted in one of the 3 slots of TTI, where the slot position corresponds to the slot position of the HS-PDSCH.

During uplink transmission, each UE UE1, UE2, UE3 uses its own respective uplink code for uplink feedback in its own uplink feedback timeslot on the HS-DPCCH (Step S4). The uplink code occupies the corresponding part of the uplink transmission time interval to the part of the downlink transmission time interval in which the data channel and control channel channelization code was transmitted in the downlink on the HS-PDSCH and HS-SCCH channels, respectively, for that particular UE UE1, UE2, UE3.

If it is determined that no channel quality indicator (CQI) is scheduled for any of the UEs UE1, UE2, UE3 (Step S5), each uplink feedback time slot carries an ACK or NACK acknowledgment of the downlink transmission from the corresponding downlink time slot (Step S6), as shown in FIG. 4 (where if an ACK is sent, this means all time slots of the TTI were decoded successfully, whereas if a NACK is sent at least one time slot was not decoded successfully).

However, if it is determined that a channel quality indicator (CQI) is scheduled for the UE UE1, UE2, UE3 (Step S5), as shown in FIG. 5, the first uplink time slot carries a sum of the (N)ACK acknowledgments from all UEs UE1, UE2 and UE3 in each TDMA multiplexed data allocation. The second and third uplink time slots then carry the channel CQI for each time slot allocated to the UEs UE1, UE2 and UE3 (Step S7).

Figure 7:
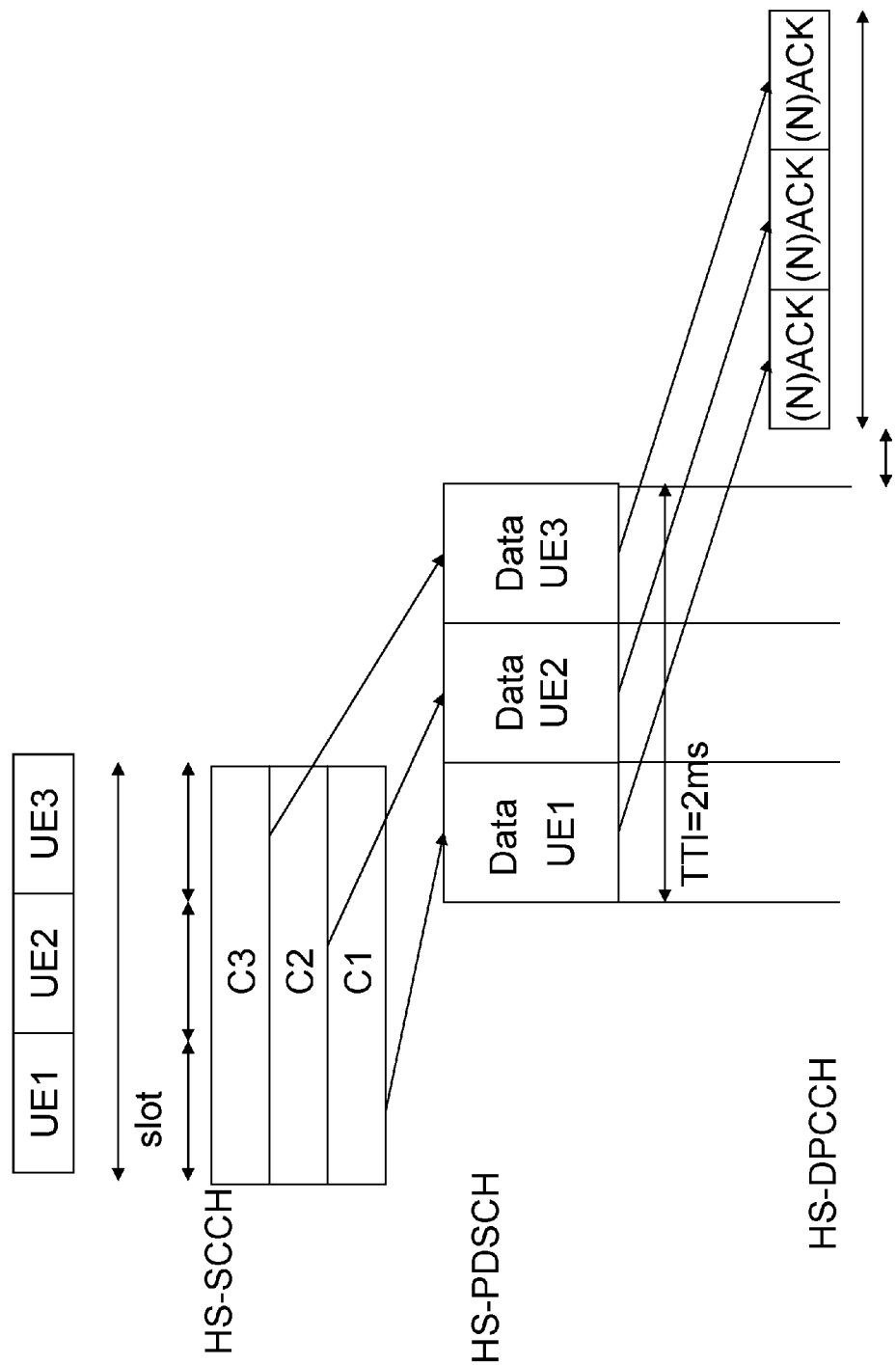
FIG. 7 is a schematic diagram of a channel structure for a communications network according to an embodiment of the invention.
Figure 8:
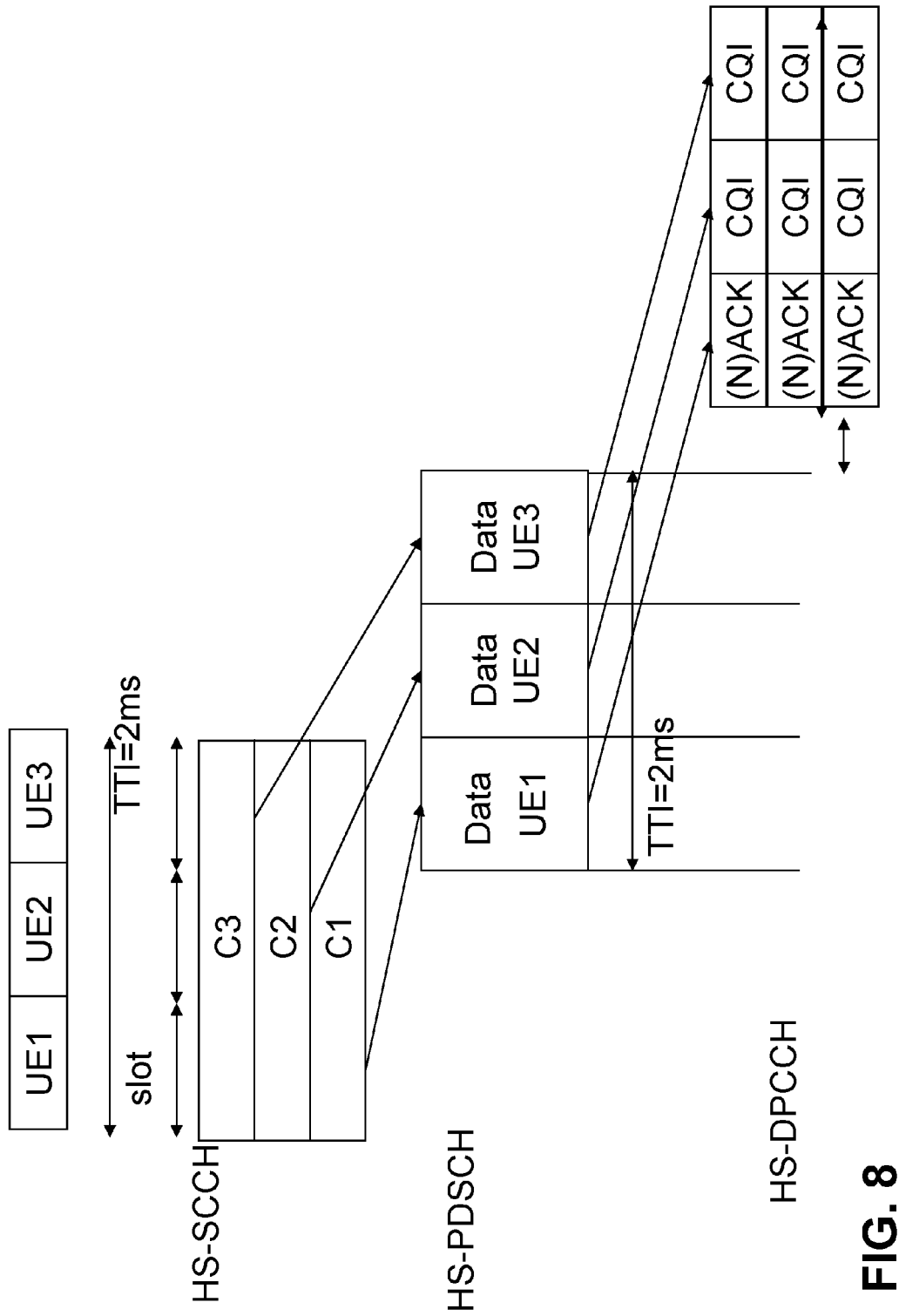
FIG. 8 is a schematic diagram of a channel structure for a communications network according to an embodiment of the invention.
Figure 9:
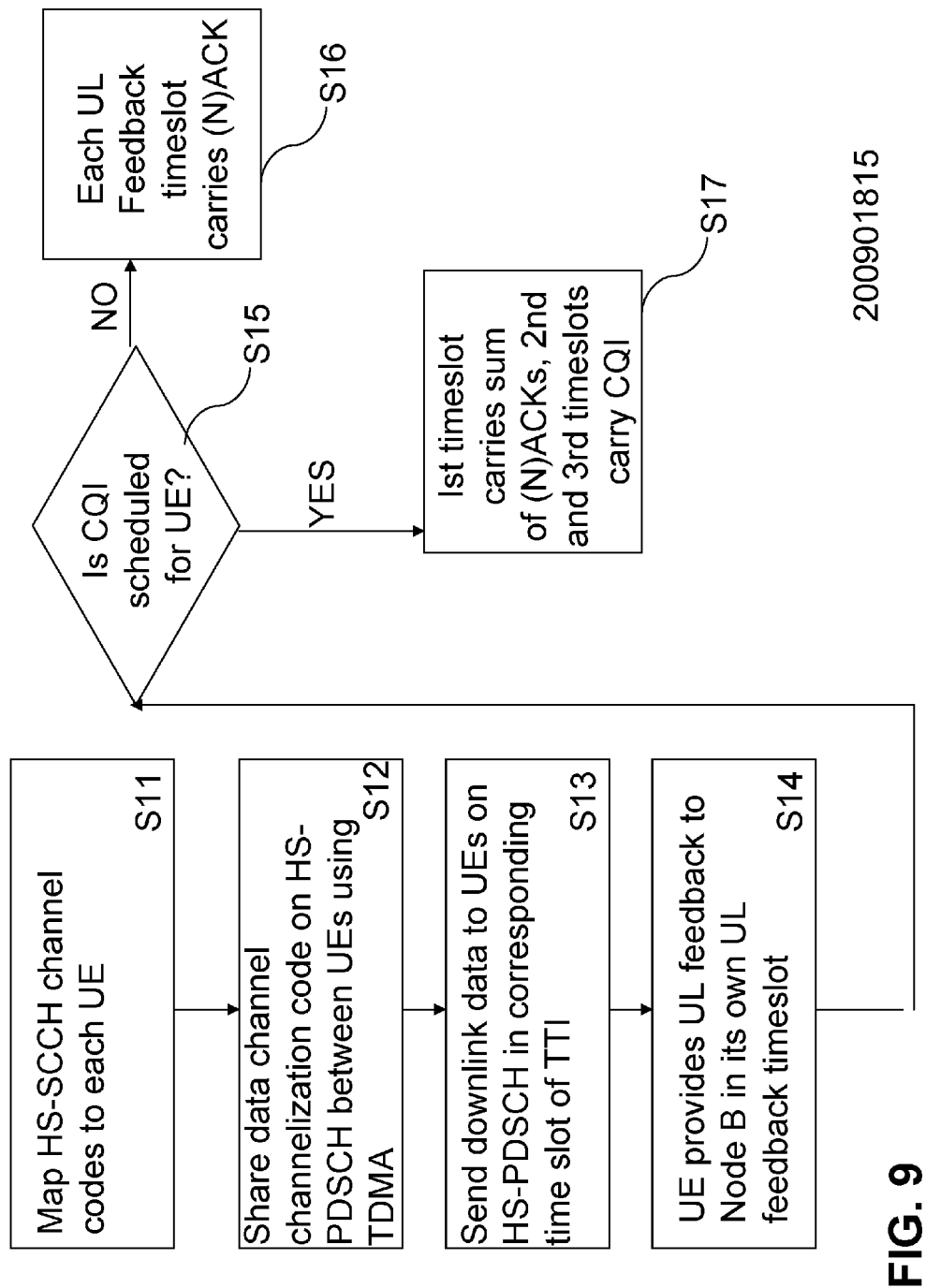
FIG. 9 is a flow diagram illustrating a method according to an embodiment of the invention.

FIGS. 7 and 8 are schematic block diagrams of the channel structure used in the method according to a second embodiment of the invention. A flow chart illustrating the method shown in FIGS. 7 and 8 is shown in FIG. 9. The HS-PDSCH carries user data and the HS-SCCH is a fixed data rate control channel carrying channelization code information necessary for HS-PDSCH demodulation by the UE UE1, UE2, UE3. All the UEs UE1, UE2 and UE3 are configured in MIMO mode.

In the second embodiment of the invention, during downlink data transmission in the network, the processor P in the NodeB 2 selects whether to allocate more than one user during 2 ms TTI. In case more than one user is to be allocated, the processor P in the Node B 2 selects the channelization code of the HS-SCCH control channel C1, C2 or C3 to be used for each UE UE1, UE2 and UE3, respectively, using time division multiplexing (TDMA) (Step S11) such that the channelization code used for the HS-SCCH control channel C1, C2 or C3 corresponds to the part of the 2 ms frame to be allocated to a particular UE UE1, UE2 or UE3 (and to be received by the UE at its receiver R1). In other words, the channelization codes C1, C2 or C3 of the control channel are "mapped" to a respective UE UE1, UE2 or UE3, although the channelization codes on the HS-SCCH control channel are code multiplexed.

For example, in the case where the 2 ms TTI is allocated in the slot level, 3 HS-SCCHs are chosen and each of the channelization codes chosen by the network node NodeB for the HS-SCCH will also indicate the part of the 2 ms TTI to be chosen (so that, in this example, the TTI is divided into three parts or slots each of duration 0.667 ms). In the case that the UEs are legacy devices, the 2 ms TTI would be filled with code multiplexing and in that case the HS-SSCH code could be selected freely from the list of HS-SCCH codes signaled for each device. Data channel channelization code on the HS-PDSCH is shared between the UEs UE1, UE2, UE3 using TDMA over the 2 ms TTI (Step S12). Data is then transmitted on the downlink from the Node B 2 to the UE UE1, UE2, UE3 on the HS-PDSCH (Step S13) and the channelization code C1, C2 or C3 on the HS-SCCH assigned to each UE UE1, UE2 and UE3, respectively, then indicates to each UE UE1, UE2 and UE3 which part of the 2 ms TTI to demodulate on the HS-PDSCH.

During uplink transmission, each UE UE1, UE2, UE3 uses its own respective uplink code UC1, UC2, UC3 for uplink feedback in its own uplink feedback timeslot on the HS-DPCCH (Step S14). The uplink code occupies the corresponding part of the uplink transmission time interval to the part of the downlink transmission time interval in which the data channel and control channel channelization code was transmitted in the downlink on the HS-PDSCH and HS-SCCH channels, respectively, for that particular UE UE1, UE2, UE3.

If it is determined that no channel quality indicator (CQI) is scheduled for any of the UEs UE1, UE2, UE3 (Step S15), each uplink feedback time slot carries an ACK or NACK acknowledgment of the downlink transmission from the corresponding downlink time slot (Step S16), as shown in FIG. 7 (where if an ACK is sent, this means all time slots of the TTI were decoded successfully, whereas if a NACK is sent at least one time slot was not decoded successfully).

However, if it is determined a channel quality indicator (CQI) is scheduled for the UE UE1, UE2, UE3 (Step S15), as shown in FIG. 8, the first uplink time slot carries a sum of the (N)ACK acknowledgments from all UEs UE1, UE2 and UE3 in each TDMA multiplexed data allocation. The second and third uplink time slots then carry the channel CQI for each time slot allocated to the UEs UE1, UE2 and UE3 (Step S17).

Although the invention has been described hereinabove with reference to specific embodiments, it is not limited to these embodiments and no doubt further alternatives will occur to the skilled person, which lie within the scope of the invention as claimed.

The invention claimed is:

1. A method comprising:
during downlink transmission, sharing a data channel channelization code on a high speed physical downlink shared channel (HS-PDSCH) between a group of mobile stations in a data communications network during a transmission time interval using time division multiple access (TDMA) such that each mobile station is allocated a share of the data channel channelization code in a time slot of the transmission time interval;
sharing a control channel channelization code between the group of mobile stations on a high speed shared control channel (HS-SCCH) during the transmission time interval using TDMA in a proportion equal to that in which the data channel channelization code is shared between the mobile stations, wherein the control channel channelization code is used for transmitting user specific data channel allocation information;
assigning a share of the control channel channelization code to a particular mobile station in the group in said time slot of the transmission time interval;
indicating using the data channel allocation information which time slot of the transmission time interval available for data can be used by said particular mobile station in the group;
transmitting the control channel channelization code in the same time slot of the transmission time interval as that in which the data channel channelization code is transmitted for said particular mobile station;
during uplink transmission using an uplink code for uplink feedback from said particular mobile station in an uplink feedback time slot of the transmission time interval on a high speed dedicated physical control channel (HS-DPCCH), wherein the time slot of the transmission time interval on the HS-DPCCH corresponds to the time slot of the transmission time interval on the HS-PDSCH in which the data channel channelization code is transmitted for that particular mobile station;
if no channel quality indicator is scheduled for any of the mobile stations in the group, carrying an ACK or NACK acknowledgment of a downlink transmission from a downlink time slot of the transmission time interval in a corresponding uplink time slot of the transmission time interval on the HS-DPCCH: and if a channel quality indicator is scheduled for at least one mobile station in the group, carrying a sum of ACK or NACK acknowledgments from the mobile stations in a first uplink time slot of the transmission time interval on the HS-DPCCH and carrying the channel quality indicator of each mobile station for which a channel quality indicator is scheduled in second and third uplink time slots of the transmission time interval.

2. The method according to claim 1, wherein the transmission time interval is 2 ms.

3. The method according to claim 1, wherein the transmission time interval is divided into three parts.

4. The method according to claim 1, wherein the HS-SCCH indicates whether TDMA is in use during a downlink transmission time interval.

5. The method according to claim 1, further comprising code division multiplexing the data channel channelization code and allocating a part of the code division multiplexed data to a further mobile station over the whole transmission time interval.

6. A mobile station comprising:
a receiver configured to receive on a high speed physical downlink shared channel (HS-PDSCH) a time division multiple access (TDMA) share of a data channel channelization code time slot of a transmission time interval, to receive an assigned share of a control channel channelization code in said time slot of the transmission time interval on a high speed shared control channel (HS-SCCH), and to receive an indication using data channel allocation information transmitted in the control channel channelization code, wherein the indication indicates which time slot of the transmission time interval available for data can be used by the mobile station; and
a transmitter configured to transmit an uplink code for uplink feedback in an uplink feedback timeslot of the transmission time interval on a high speed dedicated physical control channel (HS-DPCCH), wherein the time slot of the transmission time interval on an HS-DPCCH corresponds to the time slot of the transmission time interval on the high speed physical downlink shared channel (HS-PDSCH) in which the data channel channelization code is transmitted, to transmit an ACK or NACK acknowledgement of a downlink transmission from a downlink transmission from a downlink time slot of the transmission time interval in a corresponding uplink time slot of the transmission time interval in the HS-DPCCH if no channel quality indicator is scheduled for the mobile station, and to transmit an ACK or NACK acknowledgment in a first uplink time slot of the transmission time interval and a channel quality indicator in second and third uplink time slots of the transmission time interval on the HS-DPCCH channel if a channel quality indicator is scheduled for the mobile station.

7. A network node comprising:
at least one processor;
memory storing a program of instructions;
wherein the memory storing the program of instructions is configured to, with the at least one processor, cause the network node to at least:
share a data channel channelization code on a high speed physical downlink shared channel (HS-PDSCH) between a group of mobile stations in a data communications network during a transmission time interval such that each mobile station is allocated a share of the data channel channelization code in a time slot of the transmission time interval, to share a control channel channelization code among the group of mobile stations on a high speed shared control channel (HS-SCCH) during the transmission time interval using time division multiple access (TDMA) in a proportion equal to that in which the data channel channelization code is shared between the mobile stations, wherein the control channel channelization code is used for transmitting user specific data channel allocation information, and to assign a share of the control channel channelization code to a particular mobile station in the group in said time slot of the transmission time interval;

transmit an indication using the data channel allocation information of which time slot of the transmission time interval available for data can be used by said particular mobile station in the group, and to transmit the control channel channelization code in the same time slot of the transmission time interval as that in which the data channel channelization code is transmitted for a said particular mobile station; and receive an uplink code for uplink feedback from said particular mobile station in an uplink feedback timeslot of the transmission time interval on a high speed dedicated physical control channel (HS-DPCCH) channel, wherein the time slot of the transmission time interval on the HS-DPCCH channel corresponds to the time slot of the transmission time interval on the high speed physical downlink shared channel (HS-PDSCH) channel in which the data channel channelization code is transmitted for that particular mobile station, to receive an ACK or NACK acknowledgment of a downlink transmission from a downlink time slot of the transmission time interval in a corresponding uplink time slot of the transmission time interval if no channel quality indicator is scheduled for any of the mobile stations in the group, and to receive a sum of ACK or NACK acknowledgments from the mobile stations in a first uplink time slot of the transmission time interval on the HS-DPCCH channel and the channel quality indicator of each mobile station for which a channel quality indicator is scheduled in second and third uplink time slots of the transmission time interval on the HS-DPCCH channel if a channel quality indicator is scheduled for at least one mobile station in the group.

8. The mobile station according to claim 6, wherein the receiver is further configured to receive an indication on the HS-SCCH as to whether TDMA is in use during a downlink transmission time interval.

9. The mobile station according to claim 6, wherein the transmission time interval is 2 ms.

10. The mobile station according to claim 6, wherein the transmission time interval is divided into three parts.

11. The mobile station according to claim 6, wherein the receiver is configured to receive a code division multiplexed part of the data channel channelization code over the whole transmission time interval.

12. The network node according to claim 7, wherein the transmitter is further configured to transmit on the HS-SCCH channel an indication as to whether TDMA is in use during a downlink transmission time interval.

13. The network node according to claim 7, wherein the transmission time interval is 2 ms.

14. The network node according to claim 7, wherein the transmission time interval is divided into three parts.

15. The network node according to claim 7, wherein the processor is further configured to code division multiplex the data channel channelization code and to allocate a part of the code division multiplexed data channel channelization code to a further mobile station over the whole transmission time interval.

* * * * *

UNITED STATES PATENT AND TRADEMARK OFFICE
CERTIFICATE OF CORRECTION

PATENT NO. : 9,148,875 B2  
APPLICATION NO. : 13/996041  
DATED : September 29, 2015  
INVENTOR(S) : Holma et al.

Page 1 of 1

It is certified that error appears in the above-identified patent and that said Letters Patent is hereby corrected as shown below:

Title Page, item (30)
"PCT/EP2012/070259" should be deleted and --PCT/EP2010/070259-- should be inserted.

Signed and Sealed this
Fifteenth Day of March, 2016

Michelle K. Lee
*Director of the United States Patent and Trademark Office*